United States Patent
Funahashi

Patent Number: 5,856,821
Date of Patent: Jan. 5, 1999

[54] IMAGE DISPLAYING METHOD AND APPARATUS

[75] Inventor: Takeshi Funahashi, Kanagawa-ken, Japan

[73] Assignee: Fuji Photo Film Co., Ltd., Kanagawa-ken, Japan

[21] Appl. No.: 620,247

[22] Filed: Mar. 22, 1996

[30] Foreign Application Priority Data

Mar. 23, 1995 [JP] Japan .................................. 7-063893

[51] Int. Cl.⁶ .............................. H04N 9/74; H04N 5/445
[52] U.S. Cl. ...................... 345/130; 345/127; 345/115; 348/581; 348/564
[58] Field of Search .................................. 348/581, 561, 348/562, 563, 564; 345/55, 59, 115, 116, 119, 120, 121, 123, 124, 125, 127, 130, 118, 126–202; H04N 9/74, 5/445

[56] References Cited

U.S. PATENT DOCUMENTS

| | | | |
|---|---|---|---|
| 4,872,001 | 10/1989 | Netler | 340/721 |
| 4,933,773 | 6/1990 | Shiota et al. | 358/302 |
| 5,172,103 | 12/1992 | Kita | 340/731 |
| 5,448,372 | 9/1995 | Axman et al. | 358/342 |
| 5,454,075 | 9/1995 | Kudo | 345/201 |
| 5,457,753 | 10/1995 | Sasahara | 348/112 |
| 5,623,303 | 4/1997 | Inoue et al. | 348/96 |

Primary Examiner—Andrew I. Faile
Assistant Examiner—Vivck Srivastava
Attorney, Agent, or Firm—Sughrue, Mion, Zinn, Macpeak & Seas, PLLC

[57] ABSTRACT

In a method for displaying images on a display device having a predetermined size, m×n frames of matrix-like subset images including at least a single desired image, the subset images being among a plurality of images in a set of control format images, which are to be displayed on the display device and in which the plurality of the images are arrayed in a matrix-like form comprising M×N frames, wherein M>m and N>n, are enlarged with a scale of enlargement such that the subset images may be displayed simultaneously with a maximum possible size on the display device. The enlarged subset images are simultaneously displayed on the display device. The desired image is thereby displayed legibly such that it can be used as an effective tool in, particularly, the accurate and efficient diagnosis of an illness.

8 Claims, 2 Drawing Sheets

IMAGE DISPLAYING METHOD AND APPARATUS

BACKGROUND OF THE INVENTION

1. Field of the Invention

This invention relates to an image displaying method and apparatus for reproducing visible images from image signals and displaying them. This invention particularly relates to an image displaying method and apparatus for displaying control format images, in which a plurality of images are arrayed in a desired display form, as visible images.

2. Description of the Prior Art

Techniques for utilizing filing systems have heretofore been carried out. With the techniques, a plurality of image signals representing a plurality of images are stored in a filing system, which is provided with a storage medium, such as an optical disk. When necessary, a desired image signal is read from the filing system, and a visible image is reproduced from the image signal.

In the filing systems, a plurality of image signals representing a plurality of images of a single object, such as a patient, which images are related to one another, are often stored on the storage medium. Examples of the plurality of images, which are related to one another, include a plurality of tomographic images of a single object, such as a human body, which are recorded successively, e.g. computed tomography (CT) images and magnetic resonance imaging (MRI) images, and a plurality of contrasted images, which are obtained by recording the images of different portions of a single object such that, for example, as in a gastric examination, the state of movement of swallowed barium from the esophagus to the stomach can be viewed. When the plurality of images, which are related to one another, are to be viewed, necessary operations have heretofore been carried out by a person, who view the images, such that the images may be reproduced from the corresponding image signals and may be displayed in a desired display form on an image reproducing means, such as a cathode ray tube (CRT) display device. For example, in cases where the number of the images, which are related to one another, is 12, they are displayed as control format images, in which the 12 images are arrayed in a matrix-like form comprising 3×4 frames.

Also, it is often carried out that a plurality of images arrayed in a display form are recorded on a single sheet of film, and a diagnosis, or the like, is made by viewing the film, on which the images are recorded. However, in cases where the control format images are displayed on a display means, such as a CRT display device, it often occurs that each of the frame images becomes small, depending upon the size of the display surface of the CRT display device, and becomes illegible such that the images displayed on the CRT display device cannot be used as an effective tool in, particularly, the accurate and efficient diagnosis of an illness.

In such cases, it is considered to enlarge the control format images and to display the enlarged images on the display means. However, with such a method, it often occurs that each frame image is limited by the size of the display means (e.g., the size of the display surface of the CRT display device) and is interrupted, depending upon the scale of enlargement. If the interrupted frame image is the one which is to be used, the enlarged control format images must be scrolled and moved such that the entire area of the image to be used may be displayed on the display means. Therefore, the operation for viewing a desired image cannot be kept simple.

SUMMARY OF THE INVENTION

The primary object of the present invention is to provide an image displaying method, wherein a desired image among control format images, in which a plurality of images are arrayed in a matrix-like form, is displayed legibly such that the desired image can be used as an effective tool in, particularly, the accurate and efficient diagnosis of an illness.

Another object of the present invention is to provide an apparatus for carrying out the image displaying method.

The present invention provides an image displaying method, wherein images are displayed on a display means having a predetermined size, comprising the steps of:

i) enlarging m×n frames of matrix-like subset images including at least a single desired image, the subset images being among a plurality of images in a set of control format images, which are to be displayed on the display means and in which the plurality of the images are arrayed in a matrix-like form comprising M×N frames, wherein M>m and N>n, the enlargement being carried out with a scale of enlargement such that the subset images may be displayed simultaneously with a maximum possible size on the display means, and ii) simultaneously displaying the enlarged subset images on the display means.

The present invention also provides an image displaying apparatus provided with a display means, which has a predetermined size and on which images are displayed, the apparatus comprising:

i) an enlargement scale calculating means for calculating a scale of enlargement, with which m×n frames of matrix-like subset images including at least a single desired image are to be enlarged, the subset images being among a plurality of images in a set of control format images, which are to be displayed on the display means and in which the plurality of the images are arrayed in a matrix-like form comprising M×N frames, wherein M>m and N>n, the scale of enlargement being such that the subset images may be displayed simultaneously with a maximum possible size on the display means, and ii) an image size enlarging means for enlarging the subset images with the calculated scale of enlargement and causing the enlarged subset images to be displayed simultaneously on the display means.

The term "maximum possible size" as used herein means the size, with which the m×n frames of the subset images are displayed simultaneously on the display means such that each frame image may not be interrupted, and such that images other than the m×n frames of the subset images may not be displayed on the display means or only very small portions of the images other than the subset images may be displayed. Specifically, the term "maximum possible size" means the size such that the m×n frames of the subset images can be enlarged to the maximum possible extent within the size of the display surface of the display means and without being interrupted. For example, in cases where the control format images comprise 3×4 frames and the subset images comprise 2×2 frames, the maximum possible size is the size such that only the 2×2 frames of the subset images may be displayed on the display means or only very small portions of the other frame images, which are adjacent to the 2×2 frames of the subset images, may be displayed together with the subset images.

In the image displaying method and apparatus in accordance with the present invention, the matrix size m×n of the subset images includes the size in which the number of the row and/or the number of the column is equal to 1.

Also, in the image displaying method and apparatus in accordance with the present invention, the number of the frames of the subset images may be set previously. Alternatively, a setting means for setting the number of the frames of the subset images may be provided, and the number of the frames of the subset images may be set by the setting means when the subset images are to be displayed.

Further, the subset images, which are being displayed on the display means, may be scrolled along each row or each column of the matrix, and at least one of different subset images, which are among the control format images and are other than the subset images being displayed on the display means, may thereby be displayed on the display means.

With the image displaying method and apparatus in accordance with the present invention, the m×n frames of matrix-like subset images including at least a single desired image, which are among the M×N frames of the matrix-like control format images, are enlarged to the maximum possible size and displayed simultaneously on the display means. Therefore, the desired image can be displayed with a larger size than the size obtained when all of the control format images are simultaneously displayed on the display means. Also, the images other than the subset images are not displayed, or only very small portions of the images other than the subset images are displayed together with the subset images. Therefore, the desired image is not obstructed by the other images. Further, the desired image becomes legible, and the subset images can be used as an effective tool in, particularly, the accurate and efficient diagnosis of an illness.

Furthermore, with the image displaying method and apparatus in accordance with the present invention, wherein the subset images being displayed on the display means are scrolled along each row or each column of the matrix, the other images adjacent to the subset images can be displayed with an enlarged size. Therefore, the other images can be rendered legible as in the case of the subset images and can thereby be used as an effective tool in, particularly, the accurate and efficient diagnosis of an illness.

DESCRIPTION OF THE PREFERRED EMBODIMENTS

The present invention will hereinbelow be described in further detail with reference to the accompanying drawings.

Figure 1:
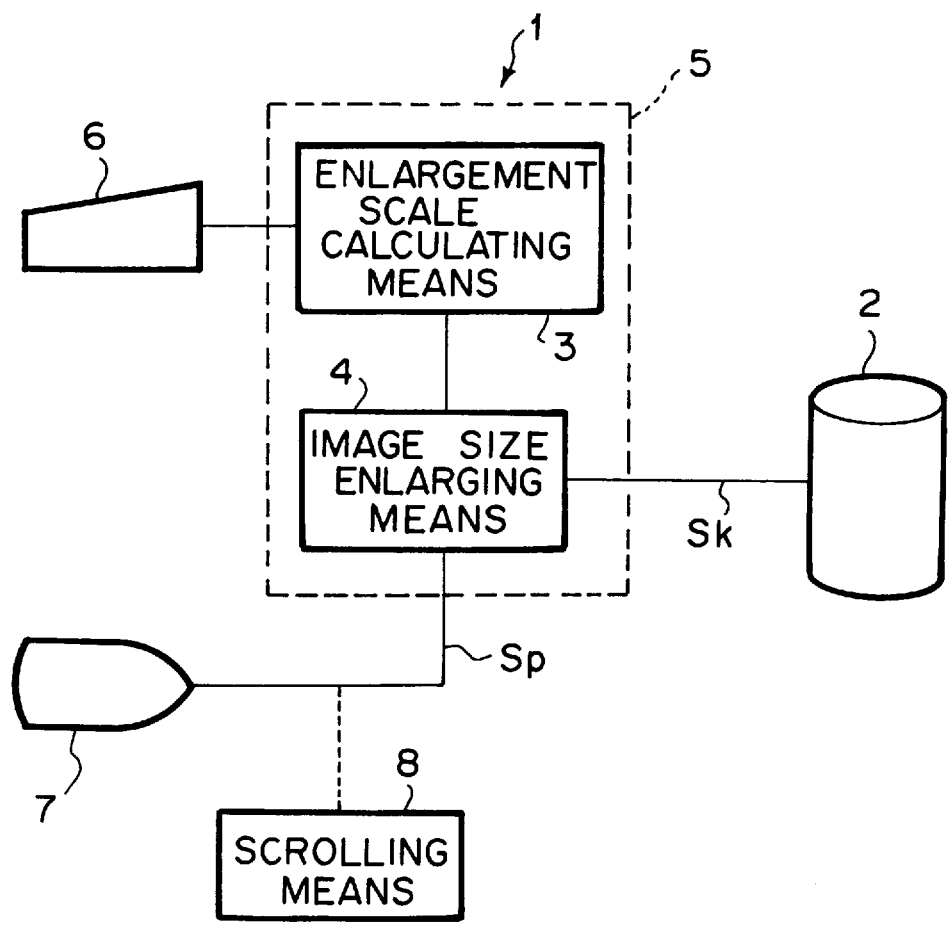
FIG. 1 is a block diagram showing an embodiment of the image displaying apparatus in accordance with the present invention.
Figure 2:
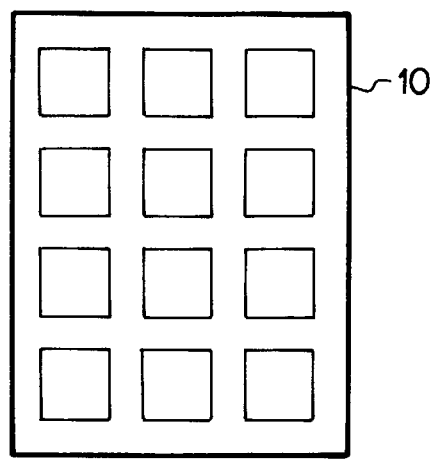
FIG. 2 is an explanatory view showing an example of a set of control format images, which are recorded on a sheet of film.

FIG. 1 is a block diagram showing an embodiment of the image displaying apparatus in accordance with the present invention. As illustrated in FIG. 1, an image displaying apparatus 1 comprises a magnetic disk 2 for storing image signals $S_k$ representing a set of control format images 10, in which 12 images are arrayed in a matrix-like form comprising 3×4 frames as illustrated in FIG. 2. The image displaying apparatus 1 also comprises CPU 5 for operating the image displaying apparatus 1. The CPU 5 is provided with an enlargement scale calculating means 3 for calculating the scale of enlargement of images, and an image size enlarging means 4 for enlarging the control format images 10 in accordance with the scale of enlargement having been calculated by the enlargement scale calculating means 3. The image displaying apparatus 1 further comprises an input means 6, which may be constituted of a keyboard and is used to input various kinds of information, such as the number of frames of the displayed images, into the CPU 5. The image displaying apparatus 1 still further comprises a CRT display device 7 serving as a display means for displaying the images.

How the image displaying apparatus 1 operates will be described hereinbelow.

Figure 3:
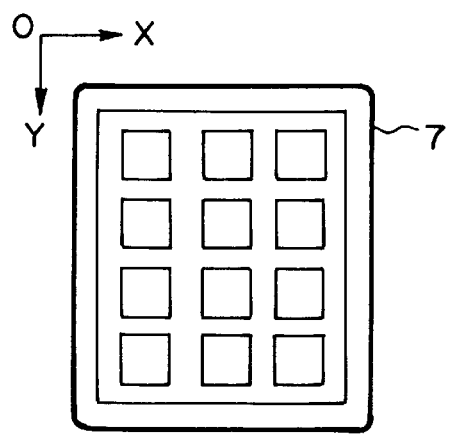
FIG. 3 is an explanatory view showing the set of control format images of FIG. 2, which are displayed on a CRT display device.

In cases where the control format images 10 shown in FIG. 2 are of the sizes recorded on a sheet of film, if the size of the display surface of the CRT display device 7 is smaller than the size of the film, it is necessary that the sizes of the control format images 10 are reduced as illustrated in FIG. 3 when they are displayed on the CRT display device 7.

However, if the sizes of the images are thus reduced, each frame image of the control format images 10 will become small and illegible. The image displaying apparatus 1 in accordance with the present invention eliminates such problems.

Firstly, information representing the number of frames of the subset images, which are among the set of control format images 10 arrayed in the matrix-like form comprising 3×4 frames and which are to be displayed on the CRT display device 7, is inputted previously from the input means 6 into the CPU 5. In this embodiment, by way of example, the number of the frames of the subset images is 2×2.

In accordance with the inputted number of the frames of the subset images and the size of the display surface of the CRT display device 7, the enlargement scale calculating means 3 calculates the scale of enlargement, with which the 2×2 frames of the subset images are to be enlarged such that they may be displayed with a maximum possible size on the CRT display device 7.

The maximum possible size is the size, with which the m×n frames of the subset images are displayed simultaneously on the CRT display device 7 such that each frame image may not be interrupted, and such that images other than the m×n frames of the subset images may not be displayed on the CRT display device 7 or only very small portions of the images other than the subset images may be displayed. Specifically, the maximum possible size is the size such that the m×n frames of the subset images can be enlarged to the maximum possible extent within the size of the display surface of the CRT display device 7 and without being interrupted. More specifically, in cases where the control format images comprise 3×4 frames and the subset images comprise 2×2 frames, the maximum possible size is the size such that only the 2×2 frames of the subset images may be displayed on the CRT display device 7 or only very small portions of the other frame images, which are adjacent to the 2×2 frames of the subset images, may be displayed together with the subset images.

The scale of enlargement is calculated in the manner described below. Specifically, the size (horizontal direction: X pixels, vertical direction: Y pixels) of each frame of image in the control format images is determined. Also, the number of frames of the subset images along the horizontal direction (m frames) and the number of frames of the subset images along the vertical direction (n frames) are determined. Further, the size (horizontal direction: $W_x$ pixels, vertical direction: $W_y$ pixels) of the image display window (i.e. the display surface) of the CRT display device 7 is determined.

The size of the region (Win disp), which is given to each of the frames of the subset images on the image display window, is calculated with the formulas shown below.

Size in horizontal direction: Xdisp=$W_x$/m

Size in vertical direction: Ydisp=$W_y$/n

Thereafter, the scale of enlargement or reduction is calculated with the formulas shown below such that each of the frames of the control format images may be accommodated with the maximum size within the Win disp.

Scale of enlargement in horizontal direction:

$$Z_x = Xdisp/X$$

Scale of enlargement in vertical direction:

$$Z_y = Ydisp/Y$$

Scale of enlargement or reduction for accommodating with maximum size:

$$Zoom = min(Z_x, Z_y)$$

In the manner described above, the display size of each frame image, to which each of the subset images is enlarged, is calculated.

The information representing the scale of enlargement, which has been calculated by the enlargement scale calculating means 3 in the manner described above, is fed into the image size enlarging means 4.

The image size enlarging means 4 enlarges the control format images 10, which are represented by the image signals $S_k$ stored on the magnetic disk 2, in accordance with the scale of enlargement having been calculated by the enlargement scale calculating means 3. The image size enlargement is carried out in the manner described below. Specifically, firstly, with the image size enlarging means 4, as illustrated in FIG. 3, the control format images 10 before being enlarged are displayed on the CRT display device 7. Also, the operator specifies a desired image on the CRT display device 7 by using the keyboard or a mouse device. The image size enlarging means 4 enlarges 2×2 frames of subset images, which include the specified image, in accordance with the scale of enlargement having been calculated by the enlargement scale calculating means 3. In this embodiment, as illustrated in FIG. 3, an X axis is taken along the horizontal direction of the control format images 10, and a Y axis is taken along the vertical direction of the control format images 10. Also, the position of each frame image is represented by (X, Y), wherein X=1 to 3 and Y=1 to 4. In cases where the operator specifies a frame image (1, 1), the image size enlarging means 4 enlarges frame images (1, 1), (2, 1), (1, 2), and (2, 2).

Figure 4:
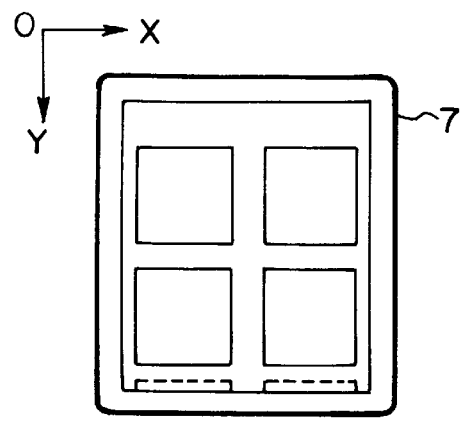
FIG. 4 is an explanatory view showing enlarged subset images, which are displayed on a CRT display device.

As illustrated in FIG. 4, the 2×2 frames of the subset images, which have been enlarged by the image size enlarging means 4, are displayed on the CRT display device 7. In cases where the 2×2 frames of the subset images are enlarged and displayed, it often occurs that portions of frame images [in this example, frame images (1, 3) and (2, 3)], which are adjacent to the 2×2 frames of the subset images, are also displayed as indicated by the broken lines in FIG. 4. However, in this embodiment, the portions of the frame images (1, 3) and (2, 3), which are adjacent to the subset images, are masked by mask processing such that they may not be displayed.

As described above, with this embodiment, the 2×2 frames of the subset images including the desired image, which are among the 3×4 frames of the control format images 10, are enlarged such that the subset images may be displayed with the maximum possible size on the CRT display device 7. Therefore, the desired image can be displayed with a larger size than the size obtained when all of the control format images 10 are displayed on the CRT display device 7 as illustrated in FIG. 3. Also, the images other than the subset images are not displayed on the CRT display device 7, or only very small portions of the images other than the subset images are displayed together with the subset images. Therefore, the desired image is not obstructed by the other images. Further, the desired image can thus be displayed legibly such that it can be used as an effective tool in, particularly, the accurate and efficient diagnosis of an illness.

It is often desired that the images adjacent to the 2×2 frames of the enlarged subset images can also be viewed. In such cases, a scrolling means 8 may be provided. The scrolling means 8 scrolls the subset images, which are being displayed in the matrix-like form on the CRT display device 7, along each row or each column of the matrix such that the images, which are other than the subset images and are among the control format images 10, may be enlarged with the scale of enlargement calculated by the enlargement scale calculating means 3 and displayed on the CRT display device 7. The images may be scrolled along each row or each column of the matrix by the scrolling means 8, and the other frame images, which are adjacent to the 2×2 frames of the subset images being displayed on the CRT display device 7, may thereby be enlarged with the same scale of enlargement as that for the originally displayed subset images and displayed on the CRT display device 7.

The subset images being displayed on the CRT display device 7 may thus be scrolled along each row or each column of the matrix by the scrolling means 8. In such cases, the other images adjacent to the subset images can be displayed with the enlarged size. Therefore, the other images can be rendered legible as in the case of the subset images and can thereby be used as an effective tool in, particularly, the accurate and efficient diagnosis of an illness.

In the embodiment described above, of the 3×4 frames of the control format images 10, the 2×2 frames of the subset images including the desired image are enlarged and displayed. However, the image displaying apparatus in accordance with the present invention is not limited to the aforesaid embodiment. For example, of the 3×4 frames of the control format images 10, any number of frames of images (e.g. 1×2 frames, 2×1 frames, or 1×1 frame) smaller than the 3×4 frames may be enlarged and displayed. Also, the control format images are not limited to the 3×4 frames and may be composed of any number of frames of images, in which a plurality of frames of images are arrayed in the matrix-like form.

Further, in the aforesaid embodiment, portions of the frame images other than the subset images being displayed are masked with the mask processing such that the portions may not be displayed on the CRT display device 7. Alternatively, in cases where the portions of the adjacent frame images do not obstruct the viewing operation, they may not be subjected to the mask processing and may be displayed on the CRT display device 7.

Furthermore, in the aforesaid embodiment, the information representing the number of frames of the subset images is inputted previously, and the scale of enlargement of the subset images is calculated previously. Alternatively, each time the images are to be displayed, the information representing the number of frames of the subset images may be inputted, the scale of enlargement of the subset images may be calculated, and the subset images enlarged with the calculated scale of enlargement may be displayed.

What is claimed is:

1. An image displaying method, wherein images are displayed on a display means having a predetermined size, comprising the steps of:

enlarging m×n frames of matrix-like subset images including at least a single desired image, said subset images being among a plurality of images in a set of control format images, which are to be displayed on the display means and in which the plurality of images are arrayed in a matrix-like form comprising M×N frames, wherein M>m and N>n, said enlargement being carried out with a scale of enlargement such that said subset images may be displayed simultaneously with a maximum possible size on the display means, and simultaneously displaying said enlarged subset images on the display means;

wherein the values of m and n representing the number of frames of said subset images are set previously; and wherein said subset images, which are being displayed on the display means, are scrolled along each row or each column of the matrix, and at least one of different subset images, which are among said control format images and are other than said subset images being displayed on the display means, is thereby displayed on the display means.

2. An image displaying method, wherein images are displayed on a display means having a predetermined size, comprising the steps of:

enlarging m×n frames of matrix-like subset images including at least a single desired image, said subset images being among a plurality of images in a set of control format images, which are to be displayed on the display means and in which the plurality of images are arrayed in a matrix-like form comprising M×N frames, wherein M>m and N>n, said enlargement being carried out with a scale of enlargement such that said subset images may be displayed simultaneously with a maximum possible size on the display means, and simultaneously displaying said enlarged subset images on the display means;

wherein the values of m and n representing the number of frames of said subset images are set when said subset images are to be displayed; and wherein said subset images, which are being displayed on the display means, are scrolled along each row or each column of the matrix, and at least one of different subset images, which are among said control format images and are other than said subset images being displayed on the display means, is thereby displayed on the display means.

3. A method as defined in claim 1 wherein the images are medical images.

4. An image displaying apparatus provided with a display means which has a predetermined size and on which images are displayed, the apparatus comprising:

an enlargement scale calculating means for calculating a scale of enlargement, with which m×n frames of matrix-like subset images including at least a single desired image are to be enlarged, said subset images being among a plurality of images in a set of control format images, which are to be displayed on the display means and in which the plurality of images are arrayed in a matrix-like form comprising M×N frames, wherein M>m and N>n, said scale of enlargement being such that said subset images may be displayed simultaneously with a maximum possible size on the display means, an image size enlarging means for enlarging said subset images with said calculated scale of enlargement and causing said enlarged subset images to be displayed simultaneously on the display means, and scrolling means for scrolling said subset images, which are being displayed on the display means, along each row or each column of the matrix;

wherein the values of m and n representing the number of frames of said subset images are set previously.

5. An image displaying apparatus provided with a display means which has a predetermined size and on which images are displayed, the apparatus comprising:

enlargement scale calculating means for calculating a scale of enlargement, with which m×n frames of matrix-like subset images including at least a single desired image are to be enlarged, said subset images being among a plurality of images in a set of control format images, which are to be displayed on the display means and in which the plurality of images are arrayed in a matrix-like form comprising M×N frames, wherein M>m and N>n, said scale of enlargement being such that said subset images may be displayed simultaneously with a maximum possible size on the display means, image size enlarging means for enlarging said subset images with said calculated scale of enlargement and causing said enlarged subset images to be displayed simultaneously on the display means, frame number setting means for setting the values of m and n representing the number of frames of said subset images, and scrolling means for scrolling said subset images, which are being displayed on the display means, along each row or each column of the matrix.

6. An apparatus as defined in claim 4 wherein the images are medical images.

7. An apparatus as defined in claim 5 wherein the images are medical images.

8. A method as defined in claim 2 wherein the images are medical images.

* * * * *